(12) United States Patent
Schaefer

(10) Patent No.: US 6,918,187 B2
(45) Date of Patent: Jul. 19, 2005

(54) MULTI PLANE PLUMB LEVEL

(76) Inventor: Brent Schaefer, 608 S. St. Andrews Pl., Apt. 309, Los Angeles, CA (US) 90005

( * ) Notice: Subject to any disclaimer, the term of this patent is extended or adjusted under 35 U.S.C. 154(b) by 0 days.

(21) Appl. No.: 10/624,813

(22) Filed: Jul. 22, 2003

(65) Prior Publication Data

US 2005/0016007 A1 Jan. 27, 2005

(51) Int. Cl.[7] .................................................. G01C 9/00
(52) U.S. Cl. .............................. 33/365; 33/383; 33/481; 33/370; 33/379
(58) Field of Search ................... 33/365, 379, 381–385, 33/347, 370–371, DIG. 1, 451, 481, 529, 412, 492

(56) References Cited

U.S. PATENT DOCUMENTS

| | | | | |
|---|---|---|---|---|
| 312,266 A | * | 2/1885 | Gurley | 33/373 |
| 351,820 A | * | 11/1886 | Ward | 33/481 |
| 582,517 A | * | 5/1897 | Bellows | 33/381 |
| 1,418,544 A | * | 6/1922 | Dodge | 33/382 |
| 1,767,335 A | * | 6/1930 | Wilcox | 269/218 |
| D138,392 S | * | 8/1944 | Bernard | D10/69 |
| 2,748,494 A | * | 6/1956 | Raney | 33/383 |
| 2,752,692 A | * | 7/1956 | Smith | 33/374 |
| 3,820,249 A | * | 6/1974 | Stone | 33/347 |
| D238,153 S | * | 12/1975 | Johson et al. | D10/69 |
| 5,174,034 A | * | 12/1992 | Swanda | 33/365 |
| D397,946 S | * | 9/1998 | Craft | D10/62 |
| 5,881,468 A | * | 3/1999 | Baumann | 33/383 |
| D416,818 S | * | 11/1999 | Olson | D10/69 |
| 6,029,359 A | * | 2/2000 | Szumer | 33/373 |

* cited by examiner

Primary Examiner—Christopher W. Fulton
Assistant Examiner—Tania Courson
(74) Attorney, Agent, or Firm—Gregory L. Roth

(57) ABSTRACT

A multi plane plumb level includes an elongated rigid frame having an X shaped cross section having four walls that are rigidly joined along an elongated central portion of the X shaped cross section and extend outward from the elongated central portion of the X shaped cross section and six level indicating bubble vials that are mounted on front and back sides of the frame in opposing pairs. A pair of flip out transversely oriented bubble vials rotates from secured positions within the front and back sides to extended positions, forming extensions of frame walls to facilitate the leveling of posts, pipes and edges. The remaining two pairs of bubble vials provide level measurements in the longitudinal direction and at a 45 degree angle.

20 Claims, 6 Drawing Sheets

MULTI PLANE PLUMB LEVEL

BACKGROUND OF THE INVENTION

The carpenters level is an ancient construction device used to assure carpenters and construction workers that the floors, walls, and other items they are installing or erecting in buildings or on land are level. More specifically, the present invention relates to the use of tradesmen for plumbing wall, studs, joists, pipes, fence posts, or anything that must be true vertical and true horizontal. Straight, level planes are an essential measurement in construction. In man's quest for a level foundation, leveling was established by a variety of methods such as water placed in a bowl, measurement via use of string, or by the human eye. More accurate design applications have evolved from these archaic devices and the basic fundamental need for horizontal and vertical measurement. Several patents, such as U.S. Pat. No. D397,946, U.S. Pat. No. D238,153, and U.S. Pat. No. 582,517 are examples of the evolution of the methods to obtain more accurate and reliable determinations of true horizontal and true vertical. In these examples of prior art, there are several embodiments of the carpenters level that depict levels with flat sides, levels that are notched on one end, and levels notched on one or two sides. However, no single device is known (prior to this present invention) that has an (X) shaped body and swivel leveling vials to plumb, post plumb, or level in multiple planes. More specifically, the Multi Plane Plumb Level is equipped with several features that essentially take the carpenters level to the next level.

An example of these differences from prior art is that the Multi Plane Plumb Level, unlike those in prior art, is notched on all four sides (otherwise described as an Interfacing Triangular Design) so that it resists bending. In addition, the almost square shape of the Multi Plane Plumb Level results in it having a low center of gravity, which retards the toppling noted in situations where prior art levels are placed on flat surfaces. The Multi Plane Plumb Level has flip out vials allowing the invention to simultaneously plumb both sides of a 90 degree corner. This feature is unique to a framing level and is more accurate on the working plane than a bull's eye bubble. This results in the user being able to do "post plumb" and intersecting 90 degree angles without moving (toggling) the level from one plane to the other. The 45-degree vials can be removed, used as a line level, and returned to their position for easy storage and accessibility.

An additional feature of the Multi Plane Plumb Level is the 90-degree (V) groove which allows the level to balance with no support on non-flat objects such as but not limited to piping, round fencing, and apexes. The invention's deep centerline also aids leveling odd angled surfaces. Adhesive magnets on the Multi Plane Plumb Level allow it to adhere to metal surfaces for hands-free maneuverability. In addition, the Multi Plane Plumb Level is equipped with protective end caps comprised of materials such as but not limited to rubber, which allows the invention to resist shock, scratch damage, and electrical conduction.

These features of the Multi Plane Plumb Level result in it being a practical and highly functional evolution of the carpenters level. In essence, the Multi Plane Plumb Level is virtually a one-stop shop for general construction and plumbing purposes. Overall, the Multi Plane Plumb Level embodies features that current rectangular, post, or spirit plumb levels cannot provide and essentially takes the carpenters level to the next level in design and functionality.

BRIEF SUMMARY OF THE INVENTION

The principle objective of the Multi Plane Plumb Level is to provide a device for use in plumbing or leveling horizontal and vertical planes in a simple, expedient, and precise manner. It is also the intent of the present invention to provide a practical evolution to the common level with its unique functionality and design features. Another objective is to give the user a device with a capability of several devices: a plumb level, a post level, and a carpenters level. The Multi Plane Plumb Level can accomplish the aforementioned objectives since it provides a portable multi-surface, multi-angled measurement device. In essence, the Multi Plane Plumb Level, a multi-plane level that comes in various lengths, is a virtual one-stop shop for general construction and plumbing purposes.

The Multi Plane Plumb Level is formed by a rigid elongated (X) shape or, more specifically, four linear, centrally located, 90-degree intersecting grooves that run the total length of the device. This level has a low center of gravity which retards toppling on flat surfaces noted with prior art levels. Its unique (X) shape resists bending and the level's 90-degree (V) groove allows it to balance on non-flat objects without any support. The 90-degree (V) groove of the Multi Plane Plumb Level aids in leveling odd angled surfaces with its deep centerline. In the vertical direction, two of these identical opposing 90-degree grooves are fitted with flip out bubble vials that swivel from a locked parallel position, to a dueling 90-degree angle. In the horizontal direction, two identical opposing bubble vials are centrally located inside the standard section. In addition, two identically located opposing bubble vials are mounted on a 45-degree angle on the opposing end. These bubble vials provide simultaneous 45-degree to 45-degree pluming capability which is unique to prior art and is more accurate on the working plane than a bull's eye bubble. These flip out vials can be removed, used as a line level, and returned to its position for easy storage and accessibility. The Multi Plane Plumb Level is also equipped with adhesive magnets that allow it to adhere to metal surfaces for hands-free maneuverability. Lastly, the Multi Plane Plumb Level is equipped with protective end caps made from materials such as but not limited to rubber which result in the invention being able to resist shock, scratch damage, and electrical conduction.

A level in accordance with the invention includes an elongated rigid frame having an X-shaped cross section with four elongated generally rectangular walls that are rigidly joined along an elongated central portion of the cross section and extend outward from the elongated central portion of the cross section. The elongated walls are uniformly rotationally spaced around the elongated central portion of the cross section at 90-degree angles to form 90-degree V grooves between facing pairs of walls. At least one level indicating bubble vial is secured to the frame and indicates when the frame has a particular orientation.

The level indicating vials preferably include a pair of flip out bubble vials mounted in opposing relationship in opposite front and rear V grooves, a pair of fixed bubble vials centrally located along the elongated central portion of the cross section and mounted in opposing relationship in the opposite front and rear V grooves and a pair of 45-degree fixed bubble vials mounted in opposing relationship in the opposite front and rear V grooves. The flip out bubble vials are hingedly secured to walls defining a lateral V groove between the front and back V grooves to allow the flip out bubble vials to be rotationally deployed from secured positions within the front and back V grooves to extended positions in which the flip out bubble vials align with and form an extension of the wall s to which the flip out bubble vials are hingedly secured. The pair of flip out bubble vials are oriented transversely to the direction of elongation.

The centrally located pair of fixed bubble vials are oriented parallel to the direction of elongation in opposing relationship within the front and back V grooves. The centrally, located pair of fixed bubble vials are oriented for viewing through the front and back grooves, but apertures are provided in the four walls in the vicinity of the bubble vials to enable viewing through side grooves as well.

The pair of 45-degree bubble vials are located within the front and back V grooves in opposing relationship and oriented at an angle of 45 degrees to the direction of elongation.

DESCRIPTION OF DRAWINGS

A better understanding of the invention may be had from a consideration of the following Detailed Description, taken in conjunction with the accompanying drawings in which.

DETAILED DESCRIPTION OF THE INVENTION

Figure 1:
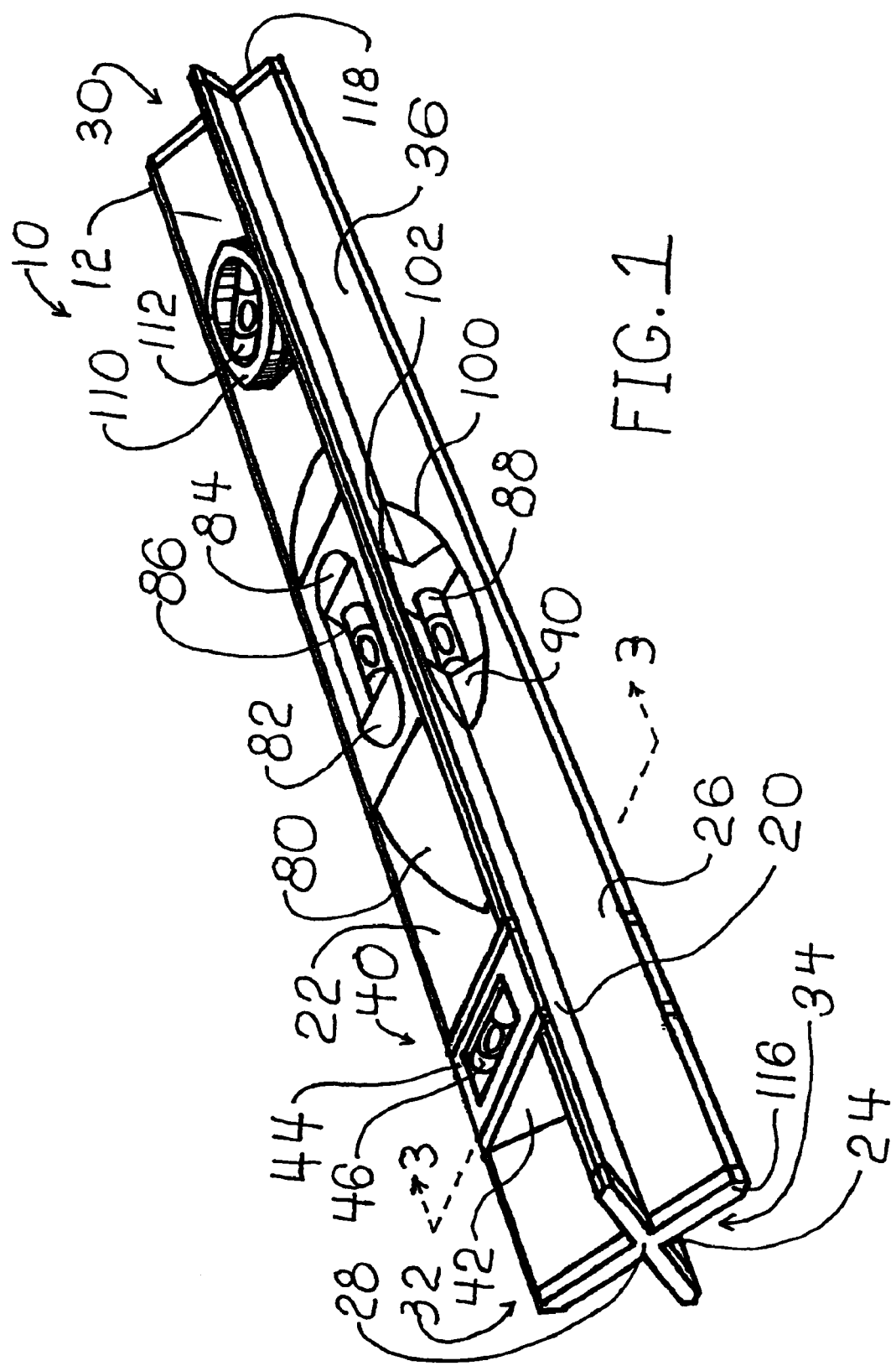
FIG. 1 is a horizontal perspective view of the Multi Plane Plumb Level in accordance with the present invention containing (6) tubular leveling.

Referring now to FIGS. 1 through 6, the preferred Multi Plane Plumb Level 10 in accordance to with the present invention includes a portable geometrical frame 12 of (X) shape cross section, which is preferably (but not limited to) aluminum or stress-resistant plastic material. The frame 12 has four elongated walls 20, 22, 24 and 26 that are joined along an elongated central portion 28 of the X shaped cross section and extend radially outward from the central portion 28. The walls 20–26 have a uniform angular spacing between facing pairs of walls.

A front 90-degree V groove 30 is formed between Walls 20 and 22, a side 90-degree V groove 32 is formed between walls 22 and 24, a rear 90-degree V groove 34 is formed between walls 24 and 26 and a side 90-degree V groove 36 is formed between walls 26 and 20.

Figure 2:
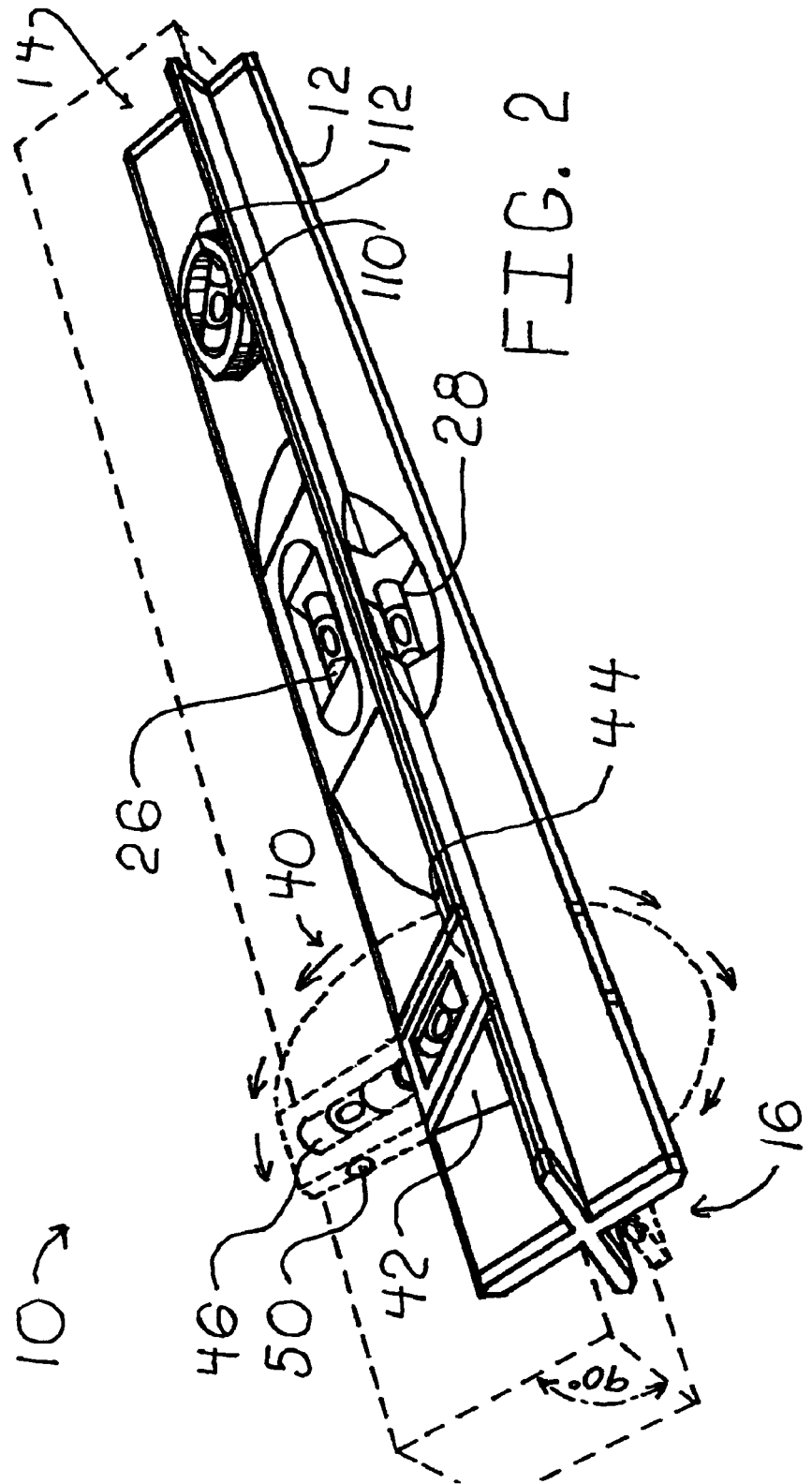
FIG. 2 is a vertical perspective view showing the action of the swivel vials in relation to a post or 45-degree planes. The rear is identical.
Figure 3:
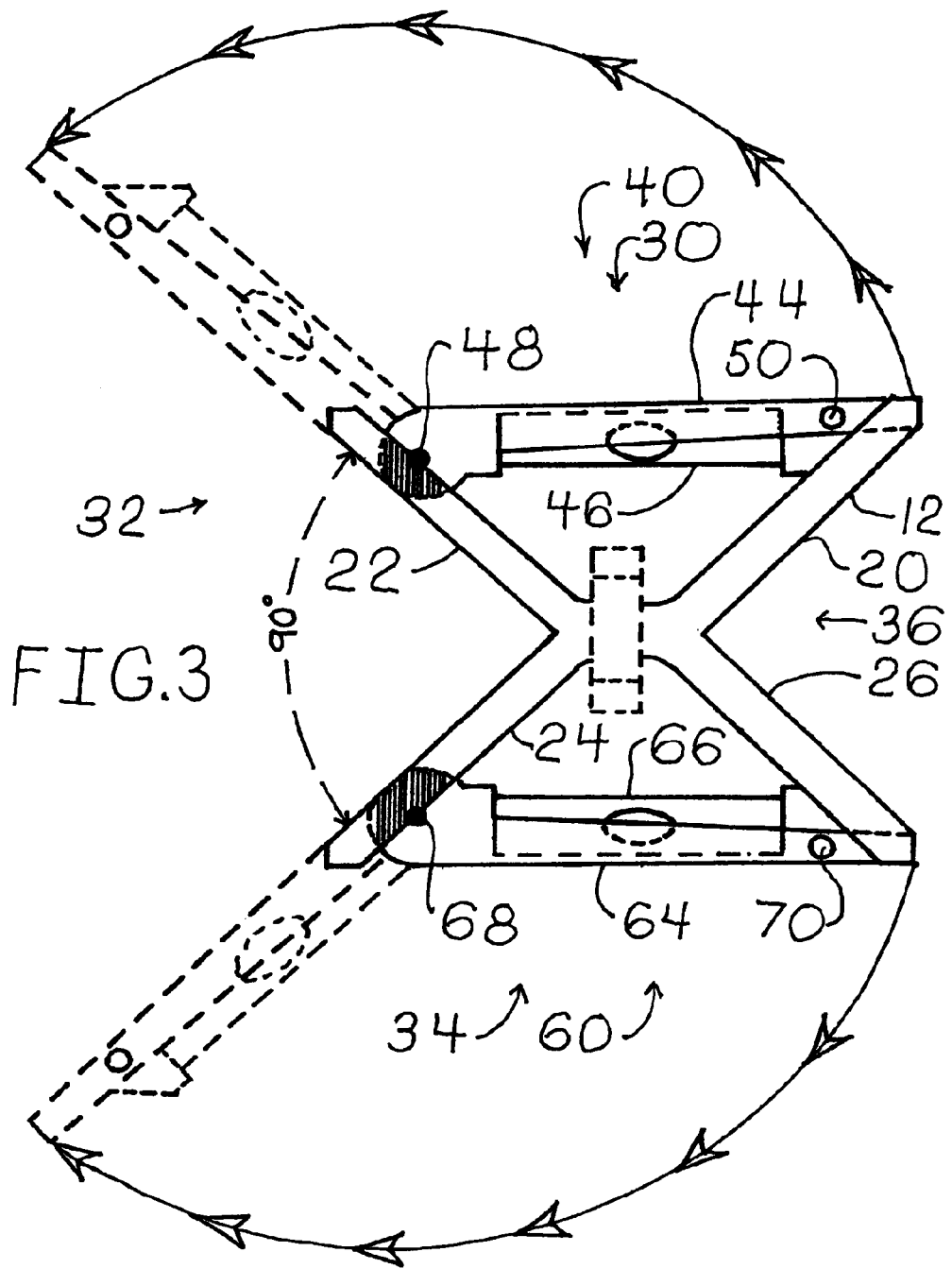
FIG. 3 is an enlarged, cross section view of the Multi Plane Plumb Level embodiment as it relates to the mechanics of the dueling swivel vials.
Figure 4:
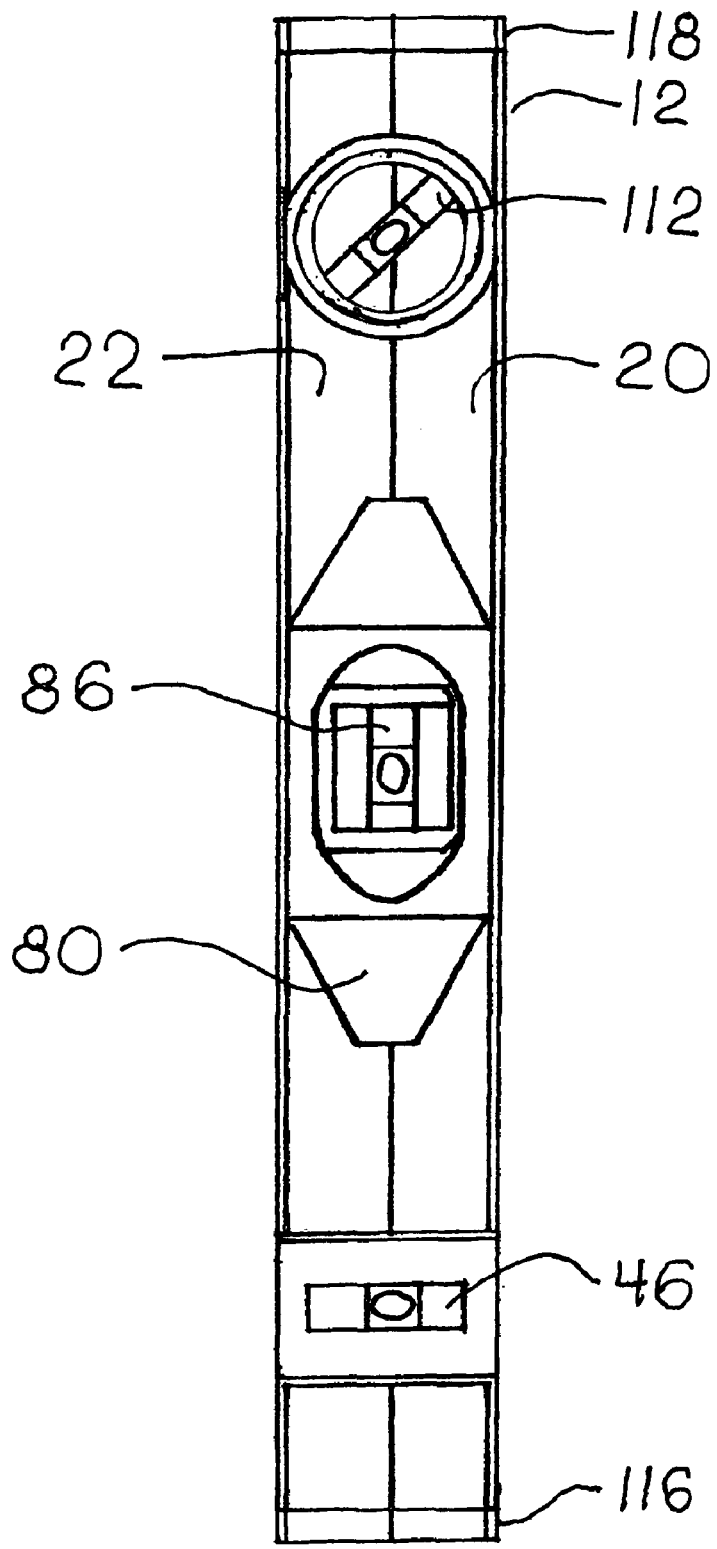
FIG. 4 is front view of the Multi Plane Plumb Level embodiment as it related to the opposing round 45-degree bubble vials.
Figure 5:
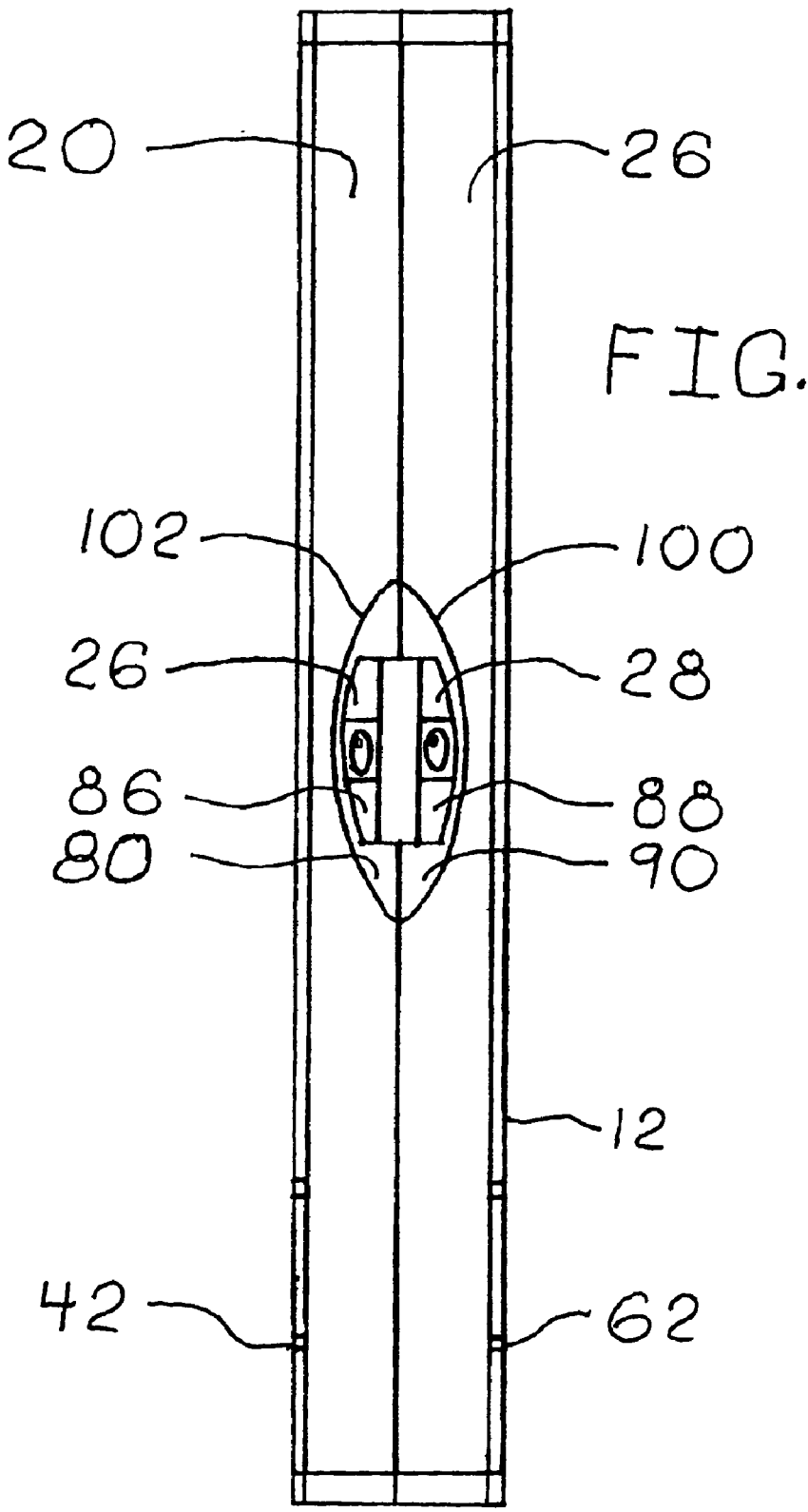
FIG. 5 is a side view of the embodiment showing the swivel vial, center mounted magnet stand, center mounted vial, and a circular 45-degree angled bubble vial. The opposite side is identical.
Figure 6:
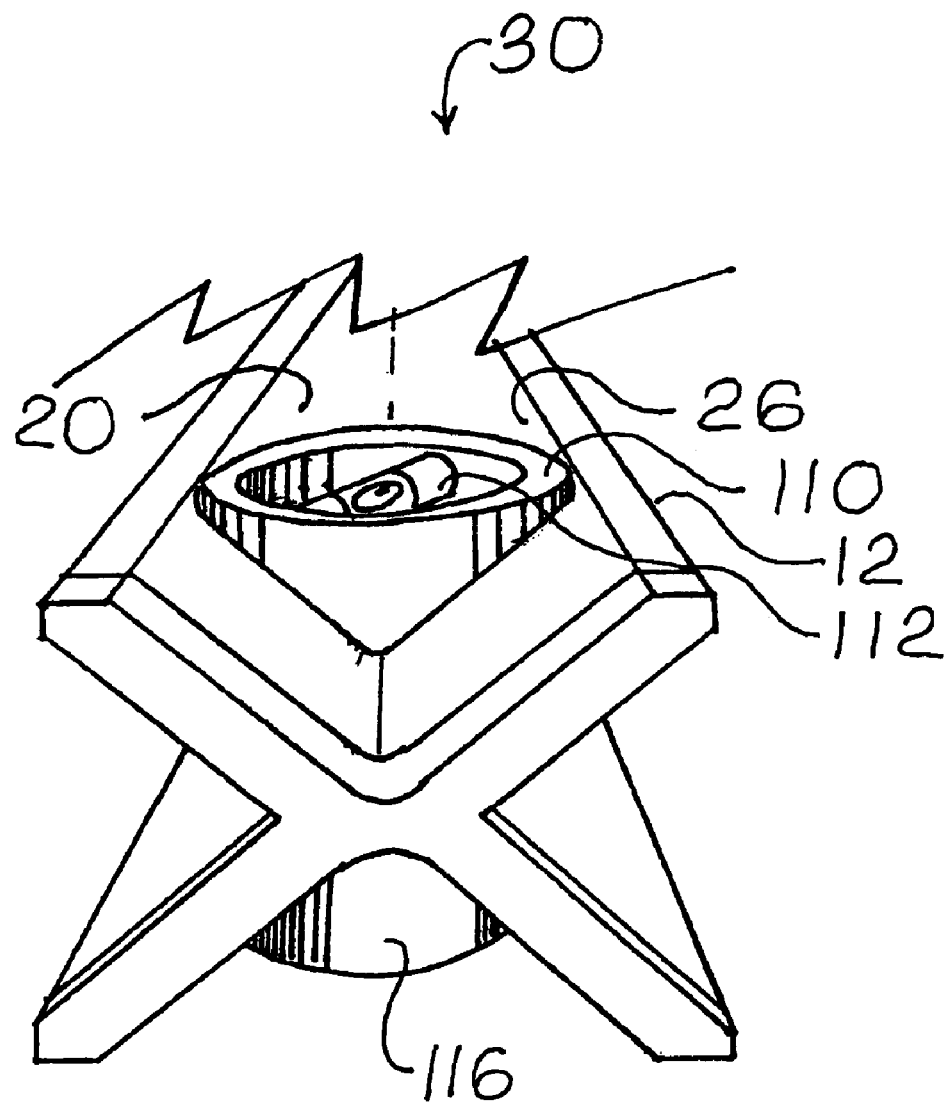
FIG. 6 is a fragmentary perspective view of the Multi Plane Plumb Level embodiment. The rear is identical.

A front swivel base assembly 40 includes a front swivel base 42 that is secured to walls 20 and 22 within groove 30 and supports a front bracket 44 which in turn holds a front swivel bubble vial 46 that is oriented transverse to the elongated central portion 28 of frame 12. Front bracket 44 is hingedly secured to front swivel base 42 by a swivel pin 48 that allows front bracket 44 to rotate between a secured position shown in FIGS. 2 and 3 by solid lines and an extended position that is shown in FIGS. 2 and 3 by dashed lines. A locking dimple or mechanism 50 secures front bracket 44 in a secured or locked position in which front bracket 44 remains flush with the frame 12.

A rear swivel base assembly 60 is disposed in opposing relationship to front swivel base assembly 40 and has the same construction as front swivel base assembly 40. Rear swivel base assembly 60 includes a rear swivel base 62 that is secured to walls 24 and 26 within groove 34 and supports a rear bracket 64 which in turn holds a rear swivel bubble vial 66 that is oriented transverse to the elongated central portion 28 of frame 12. Rear bracket 64 and rear bubble vial 66 are in opposing relationship to front bracket 44 and front bubble vial 46 when both bracket 64 and bracket 44 are in their secured position. Rear bracket 64 is hingedly secured to rear swivel base 62 by a swivel pin 68 that allows rear bracket 64 to rotate between a secured position shown in FIG. 3 by solid lines and an extended position that is shown in FIGS. 3 by dashed lines. A locking dimple or mechanism 70 secures rear bracket 64 in a secured or locked position in which rear bracket 44 remains flush with the frame 12.

A front handle molding 80 is disposed within V groove 30 and attached to frame 12. Adhesive magnets 82 and 84 are mounted in handle molding 80 and allow level 10 to adhere to a metal surface for hands free operation. A front stationary bubble vial 86 is held by front handle molding 80 and a rear stationary bubble vial 88 is held by a rear handle molding 90, which is mounted in V groove 34 with rear handle molding 90 in opposing relationship to front handle molding 80 and rear bubble vial 88 in opposing relationship to front bubble vial 86. Front and rear bubble vials 86, 88 are oriented parallel to the longitudinally extending central portion 28 of the X shaped cross section of frame 12 and are visible from the side through apertures 100 and 102 in walls 26 and .20, respectively. The other side is the same, with apertures in wall 22 and 24 making bubble vials 86, 88 visible from the other side.

A front mounting bracket 110 supports and holds a front 45-degree bubble vial 112 that is mounted at a 45 degree angle to the longitudinally extending central portion 28 of the X shaped cross section of frame 12. The rear side is the same with a rear support holding a rear 45-degree bubble vial (not shown).

Protective end caps 116, 118 result in the invention being able to resist shock, scratch damage, and electrical conduction. The extended (X) shape embodiment and its parts are preferably constructed of materials including but not limited to aluminum, rubber, and plastic.

The Multi Plane Plumb Level comes in various lengths including but not limited to 12", 24", 36", 48" and can be described as a longitudinal/horizontal 360-degree plumb level. The design of the invention lends itself to resisting bending and the adhesive magnets 82, 84 allow the Multi Plane Plumb Level to adhere to metal surfaces for hands-free maneuverability. In addition, the almost square shape of the Multi Plane Plumb Level gives the invention a wide stance resulting in it having a low center of gravity, which retards the toppling noted in situations where prior art levels are placed on flat surfaces.

The flip out vials 46, 66 allow the invention to simultaneously plumb both sides of a 90-degree corner. This feature, unique to a framing level and more accurate on the working plane than a bull's eye bubble, results in the user being able to do "post plumb" and plumb intersecting 90-degree angles without moving (togging) the level from one plane to the other. The 45-degree vials 112 can be removed, used as a line level (trapeze level line), and returned to their position for easy storage and accessibility. The 90-degree (V) grooves 30, 32, 34, 36 on the Multi Plane Plumb Level 10 allow the level to balance with no support on non-flat objects such as but not limited to piping, round fencing, and apexes. The invention's deep centerline also aids leveling odd angled surfaces. The Multi Plane Plumb Level's use by the construction trade will be advantageous. Overall, the (X)( shaped profile gives the user additional surface angles and a wider stance applicable to a multitude of plumb, post plumb, and leveling situations.

What is claimed is:

1. A level comprising:
   an elongated rigid frame having an X-shaped cross section with four elongated walls that are rigidly joined along an elongated central portion of the cross section extending outward from the elongated central portion of the cross section; and
   a level indicating bubble vial secured to the frame and indicating when the frame has a particular orientation.

2. A level according to clam 1, wherein the frame has a length of at least 6 inches in the direction of elongation.

3. A level according to claim 1, further comprising a pivotally mounted level indicating bubble vial hingedly mounted on one of the elongated walls near an outer edge thereof, the pivotally mounted level indicating vial being pivotable between a secured position in which the pitovally mounted level indicating vial extends between the outer edges of two elongated walls and an extended position in which the pivotally mounted level indicating vial extends outward from the one wall to form an extension of the one wall.

4. A level according to claim 1, further comprising two pivotally mounted level indicating bubble vials mounted on opposite sides of the frame, each pivotally mounted level indicating vial being pivotally mounted on one of the elongated walls near an outer edge thereof and being pivotable between a secured position in with the pivotally mounted level indicating vials extend between the outer edges of two elongated walls in opposed relationship to each other and an extended position in which the pivotally mounted level indicating vials extend outward to form an extensions of the walls on which the level indicating vials are pivotally mounted.

5. A level according to claim 1, further comprising first and second bubble vials fixedly mounted on the frame in opposing relationship to one another with an orientation that is parallel to the direction of elongation.

6. A level according to claim 1, wherein the level indicating bubble vial has an orientation of 45-degrees relative to the direction of elongation.

7. A level according to claim 1, wherein the level indicating bubble vial is removable from the frame.

8. A level according to claim 1, wherein the level indicating bubble vial has an orientation of 45 degrees relative to the direction of elongation and further comprising a second level indicating bubble vial fixedly secured to the frame with an orientation in a direction parallel to the direction of elongation.

9. A level according to claim 1, wherein the level indicating bubble vial has an orientation of 45 degrees relative to the direction of elongation and further comprising second and third level indicating bubble vials fixedly secured to the frame in opposing relationship to one another with an orientation in a direction parallel to the direction of elongation.

10. A level according to claim 1, wherein the frame walls define front and back 90 degree V grooves disposed in opposing relationship and further comprising:
   a front handle molding secured within the front V groove and supporting the level indicating bubble vial; and
   a rear handle molding secured within the rear V groove and supporting a rear level indicating bubble vial.

11. A level according to claim 1, wherein the frame walls define front and back 90 degree V grooves disposed in opposing relationship and further comprising:
   a front handle molding secured within the front V groove and supporting the level indicating bubble vial, the level indicating bubble vial being oriented in a direction parallel to the direction of elongation; and
   a rear handle molding secured within the rear V groove and supporting a rear level indicating bubble vial, the rear level indicating bubble vial being oriented in a direction parallel to the direction of elongation and being in opposing relationship to the first mentioned level indicating bubble vial.

12. A level according to claim 1, wherein scratch resistant end caps are secured to each end of the frame.

13. A level according to claim 1, wherein the frame walls define front and back 90 degree V grooves disposed in opposing relationship and further comprising:
   a front handle molding secured within the front V groove and supporting the level indicating bubble vial and at least one magnet; and
   a rear handle molding secured within the rear V groove and supporting a rear level indicating bubble vial.

14. A level comprising:
   an elongated rigid frame having an X-shaped cross section with four elongated walls that are rigidly joined along an elongated central portion of the cross section and rotationally spaced at 90-degree angles around the central portion of the cross section, the elongated walls extending outward from the elongated central portion; and
   a level indicating vial secured to the frame and indicating when the frame has a particular orientation.

15. A level according to claim 14, wherein the frame walls define front and back 90 degree V grooves disposed in opposing relationship and further comprising:
   a front handle molding secured within the front V groove and supporting the level indicating bubble vial; and
   a rear handle molding secured within the rear V groove and supporting a rear level indicating bubble vial.

16. A level according to clam 14, wherein the frame has a length of at least 60 inches in the direction of elongation.

17. A level according to claim 14, further comprising a pivotally mounted level indicating bubble vial hingedly mounted on one of the elongated walls near an outer edge thereof, the pivotally mounted level indicating vial being pivotable between a secured position in which the pivotally mounted level indicating vial extends between the outer edges of two elongated walls and an extended position in which the pivotally mounted level indicating vial extends outward from the one wall to form an extension of the one wall.

18. A level according to claim 14, further comprising two pivotally mounted levels indicating vials mounted on opposite sides of the frame, each pivotally mounted level indicating vial being pivotally mounted on one of the elongated walls near an outer edge thereof and being pivotable between a secured position in with the pivotally mounted level indicating vials extend between the outer edges of two elongated walls in opposed relationship to each outer and extended position in which the pivotally mounted level indicating vials extend outward to form an extensions of the walls on which the level indicating vials are pivotally mounted.

19. A level according to claim 14, further comprising first and second bubble vials fixedly mounted on the frame in opposing relationship to one another with an orientation that is parallel to the direction of elongation.

20. A level comprising:

an elongated rigid frame extending along a direction of elongation and having an X-shaped cross section, the frame having four elongated generally rectangular walls that are rigidly joined along an elongated central portion of the cross section, the elongated walls extending outward from the elongated central portion of the cross section and being rotationally uniformly spaced around the elongated central portion of the cross section, the walls forming 90-degree V grooves between facing pairs of walls, the V grooves including a front V groove and an opposing rear V groove;

first and second bubble vials, the first and second bubble vials being flip out level indicating bubble vials hingedly secured to different walls of the frame with an orientation transverse to the direction of elongation, the first and second bubble vials being rotatable between a secured position in which the first and second bubble vials are disposed in opposing relationship to one another within the front and rear V grooves, respectively, and an extended position in which the first and second bubble vials each form an extension of a wall to which the bubble vial is secured;

second and third bubble vials disposed in opposing relationship within the front and back grooves, respectively, of the frame with an orientation that is parallel to the elongated central portion of the cross section, the four walls each having an aperture formed therein at a location that enables the second and third bubble vials to be viewed from both sides of the frame; and fifth and sixth bubble vials disposed in opposing relationship with the front and back grooves, respectively, the fifth and sixth bubble vials being oriented at an angle of 45-degrees to the direction of elongation.

* * * * *